(12) United States Patent
Jebara et al.

(10) Patent No.: US 8,714,370 B2
(45) Date of Patent: May 6, 2014

(54) SYSTEMS AND METHODS FOR SECURING FOOTWEAR TO A BAG, BACK-PACK, OR OTHER OBJECT

(75) Inventors: Nour Jebara, Far Hills, NJ (US); Liam Van Der Merwe, Basking Ridge, NJ (US)

(73) Assignee: Sterko LLC, Far Hills, NJ (US)

( * ) Notice: Subject to any disclaimer, the term of this patent is extended or adjusted under 35 U.S.C. 154(b) by 456 days.

(21) Appl. No.: 12/947,325

(22) Filed: Nov. 16, 2010

(65) Prior Publication Data

US 2011/0113595 A1 May 19, 2011

Related U.S. Application Data

(63) Continuation-in-part of application No. 12/592,321, filed on Nov. 23, 2009, now abandoned.

(60) Provisional application No. 61/261,746, filed on Nov. 17, 2009.

(30) Foreign Application Priority Data

Nov. 23, 2009 (CN) .......................... 2010 1 0149363

(51) Int. Cl.
*A47F 7/08* (2006.01)
*A41D 27/22* (2006.01)

(52) U.S. Cl.
USPC ............................................. 211/34; 223/85

(58) Field of Classification Search
USPC ................ 211/34, 89.01, 113, 119, 119.004, 211/119.006, 119.007, 119.12, 119.13, 211/181.1; 223/89, 90, 94; 24/335, 522, 24/527, 542, 568; 269/43, 45, 143, 246; 294/16, 119.1; 12/114.8, 116.8
See application file for complete search history.

(56) References Cited

U.S. PATENT DOCUMENTS 697,103 A * 4/1902 Pickhardt ........................ 223/95
1,746,962 A 2/1930 Perry
(Continued)

FOREIGN PATENT DOCUMENTS

| CN | 201315890 Y | 9/2009 |
| GB | 2409807 A | 7/2005 |
| WO | 9902934 | 1/1999 |

OTHER PUBLICATIONS

Phineas Products, Tthe Shoe Hanger Company, Products: Shoe Hangers, Boot Clips, Sandal and Flip Flop Hangers, dated Oct. 7, 2010.

(Continued)

*Primary Examiner* — Joshua Rodden
(74) *Attorney, Agent, or Firm* — Amster, Rothstein & Ebenstein LLP

(57) ABSTRACT

The invention generally relates to a footwear clamp bag accessory used to clamp a pair of shoes together and couple the clamped shoes to some other object using a claw-lock/clip. The footwear clamp bag accessory can include a base, at least two clamps, a locking mechanism, and a claw-lock/clip. The base can be the main structure that at least a portion of the clamps ride and that the claw-lock/clip is affixed to via a strap/cord. The at least two clamps can be a left clamp and a right clamp. Each of the left and right clamps can include a portion that rides a portion of the main structure. Further, clamp pads can couple to the left clamp and right clamp.

18 Claims, 9 Drawing Sheets

(56) References Cited

U.S. PATENT DOCUMENTS

| | | | |
|---|---|---|---|
| 2,283,530 A * | 5/1942 | Bohachef | 223/91 |
| 2,376,097 A | 5/1945 | Stamm | |
| D157,089 S * | 1/1950 | Saunders | D6/318 |
| 2,637,471 A * | 5/1953 | Goldschmidt et al. | 223/89 |
| 2,641,366 A | 6/1953 | Burch | |
| 2,787,379 A | 4/1957 | Fritz et al. | |
| 2,812,066 A | 11/1957 | Volosin | |
| 2,900,117 A * | 8/1959 | Veltry | 223/94 |
| 2,969,151 A | 1/1961 | Krstulovich | |
| 2,977,000 A | 3/1961 | Sitzman | |
| 3,237,225 A | 3/1966 | Schleman | |
| 3,249,231 A | 5/1966 | Matlock | |
| 3,317,054 A | 5/1967 | Gies | |
| 3,341,242 A * | 9/1967 | Carson | 294/16 |
| 3,802,572 A | 4/1974 | Shackel | |
| 4,094,030 A | 6/1978 | Saad | |
| 4,261,609 A * | 4/1981 | Kraszewski et al. | 294/119.1 |
| 4,336,962 A * | 6/1982 | Read | 294/106 |
| 4,563,373 A * | 1/1986 | Barnett | 428/16 |
| 4,624,396 A * | 11/1986 | Universe | 223/92 |
| 4,629,103 A | 12/1986 | Miller | |
| 4,669,615 A | 6/1987 | Zigman | |
| 4,739,911 A * | 4/1988 | Quinn | 223/85 |
| 4,796,337 A | 1/1989 | Marxer | |
| 4,942,994 A | 7/1990 | Sterenberg | |
| 4,953,714 A | 9/1990 | Paul | |
| 4,968,077 A * | 11/1990 | Redmon et al. | 294/16 |
| 5,042,118 A | 8/1991 | Rubik | |
| 5,201,443 A * | 4/1993 | Oswald | 223/85 |
| 5,397,038 A * | 3/1995 | Hunt | 223/95 |
| 5,664,719 A | 9/1997 | Bigham et al. | |
| 5,680,972 A * | 10/1997 | Clarke | 223/88 |
| 6,402,105 B1 | 6/2002 | Hoyt et al. | |
| 6,644,520 B2 * | 11/2003 | Lam | 223/94 |
| 6,811,064 B2 * | 11/2004 | Salem | 223/94 |
| 7,077,300 B1 * | 7/2006 | Di Pietro | 223/89 |
| 7,775,410 B2 | 8/2010 | Zamzow | |
| 7,901,115 B2 * | 3/2011 | Chien | 362/397 |
| 8,226,140 B1 * | 7/2012 | Dietrich et al. | 294/119.1 |
| 2006/0002134 A1 | 1/2006 | Capriola | |
| 2009/0188952 A1 * | 7/2009 | Boyd | 223/86 |
| 2012/0223108 A1 * | 9/2012 | Boyd | 223/86 |

OTHER PUBLICATIONS

International Search Report, dated Jan. 31, 2011 for PCT/US2010/057003.

Written Opinion of the International Searching Authority, dated Jan. 31, 2011 for PCT/US2010/057003.

* cited by examiner

SYSTEMS AND METHODS FOR SECURING FOOTWEAR TO A BAG, BACK-PACK, OR OTHER OBJECT

CROSS-REFERENCE TO RELATED APPLICATIONS

This application claims priority to U.S. Provisional Patent Application No. 61/261,746, filed Nov. 17, 2009 and Chinese Patent Application No. 201010149363.3, filed Feb. 23, 2010; and is a Continuation-In-Part of U.S. Non-Provisional patent application Ser. No. 12/592,321, filed Nov. 23, 2009; the contents of which are incorporated herein by reference in their entirety.

FIELD

The present invention relates to systems and methods for securing footwear to a bag, back-pack, and/or other object.

BACKGROUND

There are times when individuals transport a pair of footwear with them. For example, an individual going to/from the gym may transport an extra pair of gym shoes with them. As another example, traveling and/or hiking some individuals prefer to transport an additional pair of shoes with them. As yet another example, going to a beach some individuals prefer to wear sandals on the beach and shoes on the boardwalk.

Many individuals find transporting footwear to be substantially difficult. For example, transporting footwear by hand can interfere with the movement and/or function of at least one of their hands. To avoid, amongst other things, this problem, some transport footwear in a bag. For example, some individuals transport footwear in their purse, back-pack, or other bag. However, transporting footwear in a bag, the footwear can substantially minimize the remaining free volume of the bag and/or the footwear can damage and/or interfere with other items in the bag.

Further, some individuals find footwear odor to be substantially offensive and/or footwear can be substantially dirty. Transporting footwear by hand can cause individuals and others to smell this offensive odor and/or contact the substantially dirty footwear. Also, transporting footwear contained in a bag can cause other items in the bag to have this odor diffused into them and/or other items can become dirty due to the substantially dirty footwear being located in the bag at some point.

SUMMARY

In exemplary embodiments, a footwear clamp bag accessory can be designed to facilitate the transportation of footwear by freeing a user's hands and/or freeing up space in the user's bag.

In exemplary embodiments, a footwear clamp bag accessory for holding shoes together and coupling to structures can comprise: a base that can have a horizontal portion and/or a base shoe retaining portion, the base shoe retaining portion can extend vertically downwards from the horizontal portion and can divide the horizontal portion into a left horizontal portion and a right horizontal portion. The footwear clamp bag accessory can further comprise: a left arm that can have a left horizontal receiving portion and/or a left shoe retaining portion, the left shoe retaining portion can extend vertically downwards from the left horizontal receiving portion and/or the left horizontal receiving portion can be slidably coupled to the left horizontal portion of the base such that left arm can be capable of moving towards and away from the central shoe retaining portion. Also, the footwear clamp bag accessory can further comprise: a right arm that can have a right horizontal receiving portion and/or a right shoe retaining portion, the right shoe retaining portion can extend vertically downward from the right horizontal receiving portion and/or the right horizontal receiving portion can be slidably coupled to the right horizontal portion of the base such that the right arm can be capable of moving towards and away from the central shoe retaining portion. Further still, the footwear clamp bag accessory can also comprise: a locking mechanism that can restrict the left arm and the right arm from moving, for example, away from the base shoe retaining portion thereby clamping shoes; and can include a clip that can be connected to a strap, the strap can be affixed to the base, the left arm, and/or the right arm, and the clip used to attach the clamped shoes to structures.

In exemplary embodiments, the horizontal and/or vertical portion of the base can be constructed in a t-shaped configuration.

In exemplary embodiments, the clip can be at least one of a carabineer and a key ring.

In exemplary embodiments, the left arm, the right arm, and/or the base can further comprise: a shoe contacting region that can be substantially flat and/or large to, for example, reduce the risk of damaging clamped shoes.

In exemplary embodiments, the left arm, the right arm, and/or the base, can further comprise: (i) a scent emitting element, the scent emitting element can be releasably coupled to the left arm, the right arm, and/or the base; and/or (ii) a scent absorbing element; the scent absorbing element can be releasably coupled to the left arm, the right arm, and/or the base. Further, the left arm, the right arm, and/or the base can emit scents and/or absorb scents. Further still, the left arm, the right arm, and/or the base, can further comprise: (i) a pad that can emit scents and/or absorb scents and/or (ii) a pad that can include an element that can emit scents and/or absorb odors.

In exemplary embodiments, movement of the left and/or right arms along the horizontal portion of the base can be restricted such that they cannot be completely separated and/or removed from the base. Further, movement of the left and right arms can be restricted by a shock cord connecting the left and right arms. Further still, movement of the left and/or right arms can be restricted by, for example, (i) a stopper mechanism located on an internal surface of the base, (ii) a stopper mechanism located on an external surface of the base, and/or (iii) a stopper mechanism located on the left arm and the right arm.

In exemplary embodiments, the locking mechanism can further comprise a hook on the left arm and/or right arm; and/or a series of latches at various distances on the left arm and/or right arm. Further, in some instances, the locking mechanism can be locked and require the user input a key and/or use a key to unlock the locking mechanism. This can be used to, amongst other things, substantially reduce the chances of a user's shoes being stolen.

In exemplary embodiments, the locking mechanism can further comprise: a spring lever lock, a vise-grip type lever lock, a releasable wire tie type lever lock, and/or an electro-mechanical lever lock.

In exemplary embodiments, the footwear clamp bag accessory can further comprise: solar power cell(s) to power an electro-mechanical lever lock, a light source, and/or an LED.

In exemplary embodiments, the left arm, the right arm, and/or the vertical portion of the base, can further comprise: a configuration wherein, for example, the left arm and/or the right arm can extend vertically downwards in an arch configuration; the base shoe retaining portion can extend vertically downwards in a substantially straight configuration; the left arm and/or the right arm can arch inwards towards the substantially straight shaped base retaining portion; and/or the curvature of the arch and/or the length of the arch can be selected to compensate for various shoe side wall thicknesses.

In exemplary embodiments, the left arm and/or the right arm, can further comprise: an at least one opening in the left arm and/or the right arm, the at least one opening can receive the left horizontal portion of the base and/or right horizontal portion of the base.

In exemplary embodiments, the footwear clamp bag accessory can further comprise: an LED, light attachment, and/or at least some portion of the footwear clamp bag accessory can glow in the dark.

In exemplary embodiments, the footwear clamp bag accessory can further comprise: a guard and/or rain guard.

In exemplary embodiments, the overall shape of the footwear clamp bag accessory can be shaped like a super hero, and/or animal.

BRIEF DESCRIPTION OF THE DRAWINGS

The features and advantages of the present invention will be more fully understood with reference to the following, detailed description when taken in conjunction with the accompanying figures, wherein.

DETAILED DESCRIPTION

Figure 1:
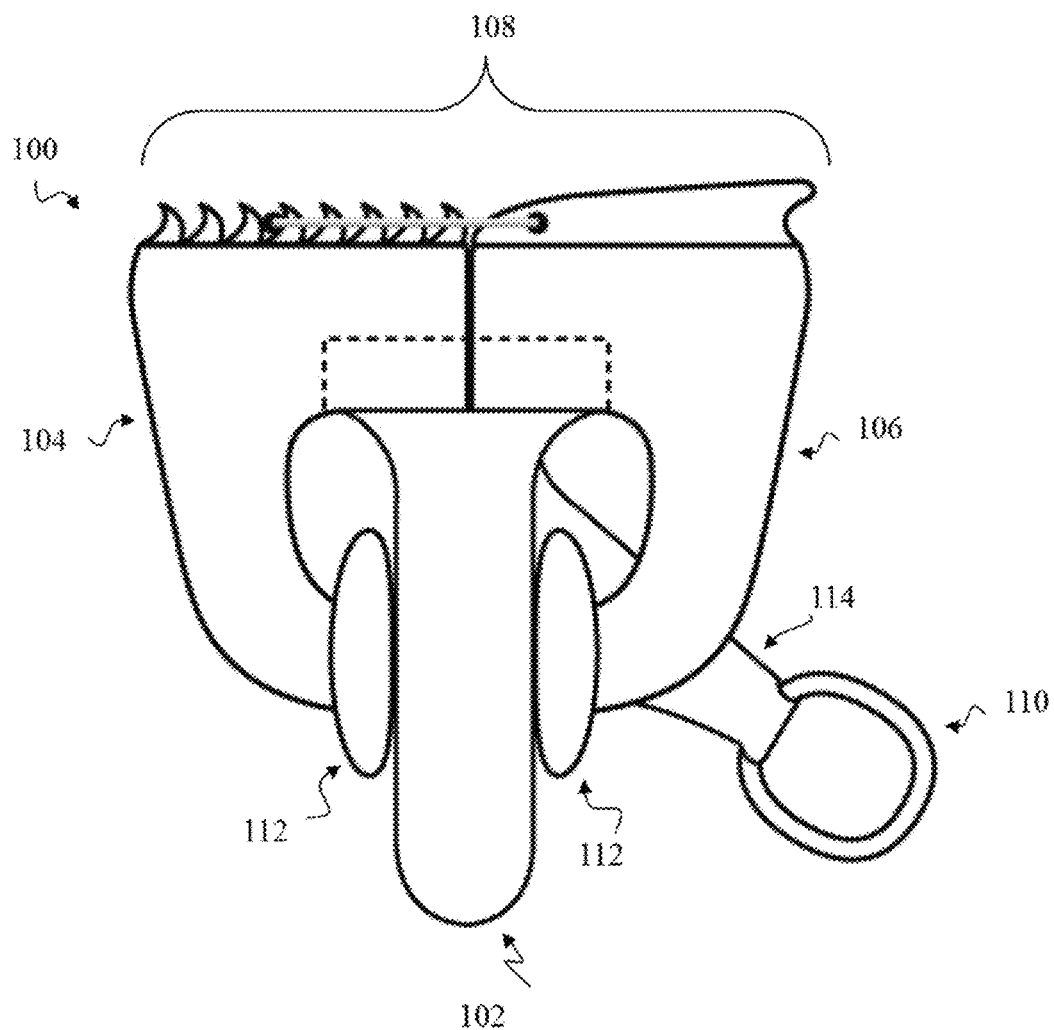
FIG. 1 is a frontal view illustratively depicting an exemplary footwear clamp bag accessory in an exemplary locked position, in accordance with exemplary embodiments of the present invention.
Figure 2A:
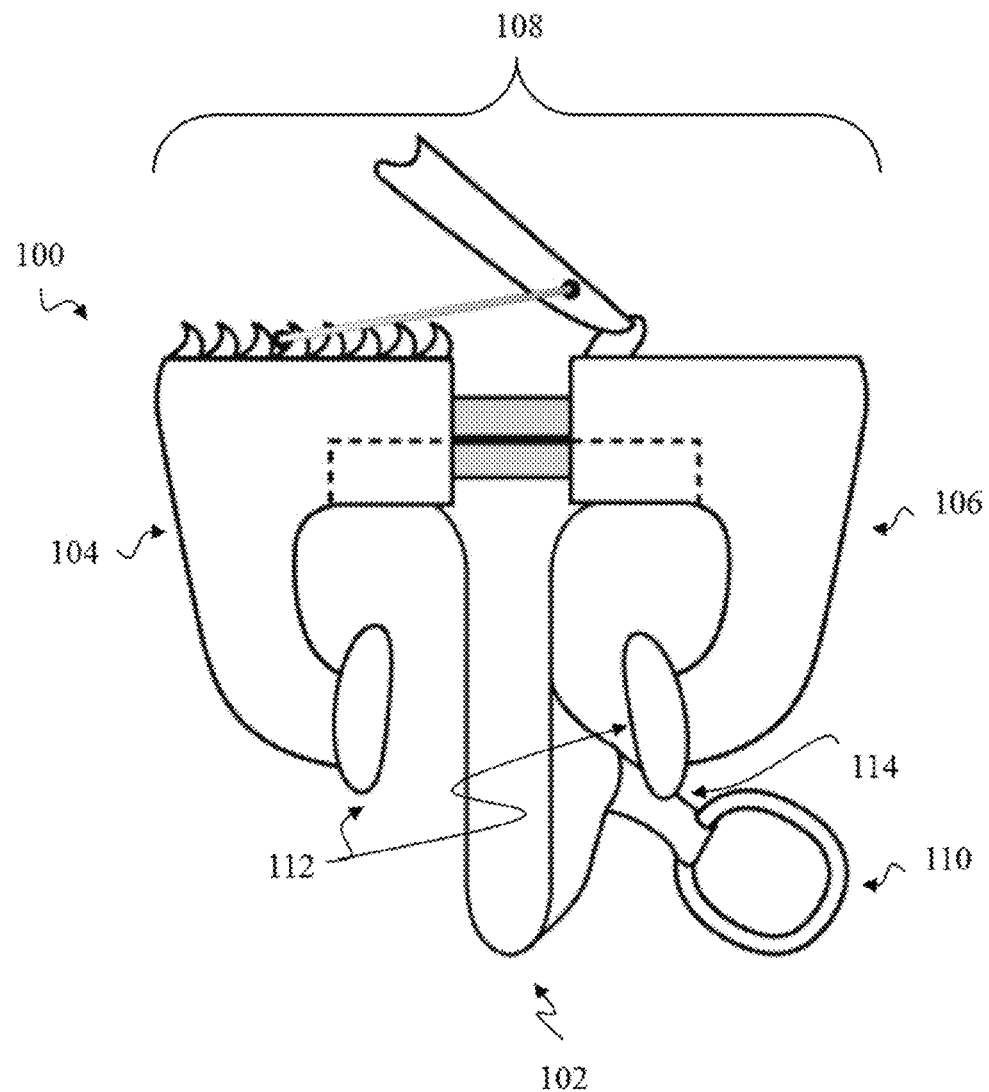
FIGS. 2A-2B are frontal views illustratively depicting an exemplary footwear clamp bag accessory in an exemplary unlocked position, in accordance with exemplary embodiments of the present invention.
Figure 2B:
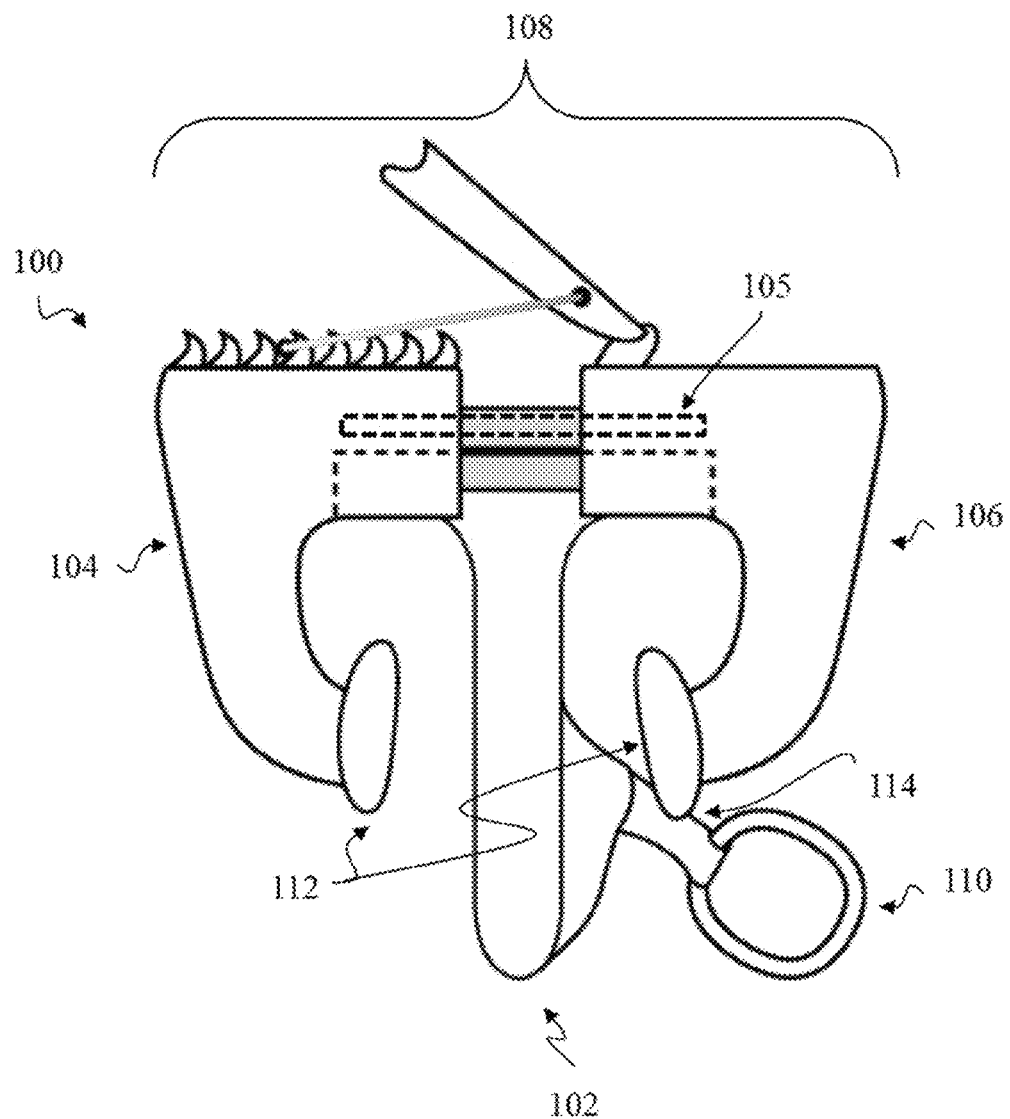

The invention generally relates to a footwear clamp bag accessory used to clamp a pair of shoes together and couple the clamped shoes to some other object using a claw-lock/clip.

Referring to FIGS. 1-7, in exemplary embodiments, a footwear clamp bag accessory 100 can include a base 102, a left arm 104, a right arm 106, a locking mechanism 108 and a claw-lock/clip 110. Base 102 can be the main structure that at least a portion of left arm 104 and right arm 106 ride and that claw-lock/clip 110 can be affixed to, for example, base 102 via a strap 114. Each of left arm 104 and right arm 106 can include a portion that rides on a portion of base 102. Further, a pad 112 can be coupled to left arm 104 and/or right arm 106.

Figure 3:
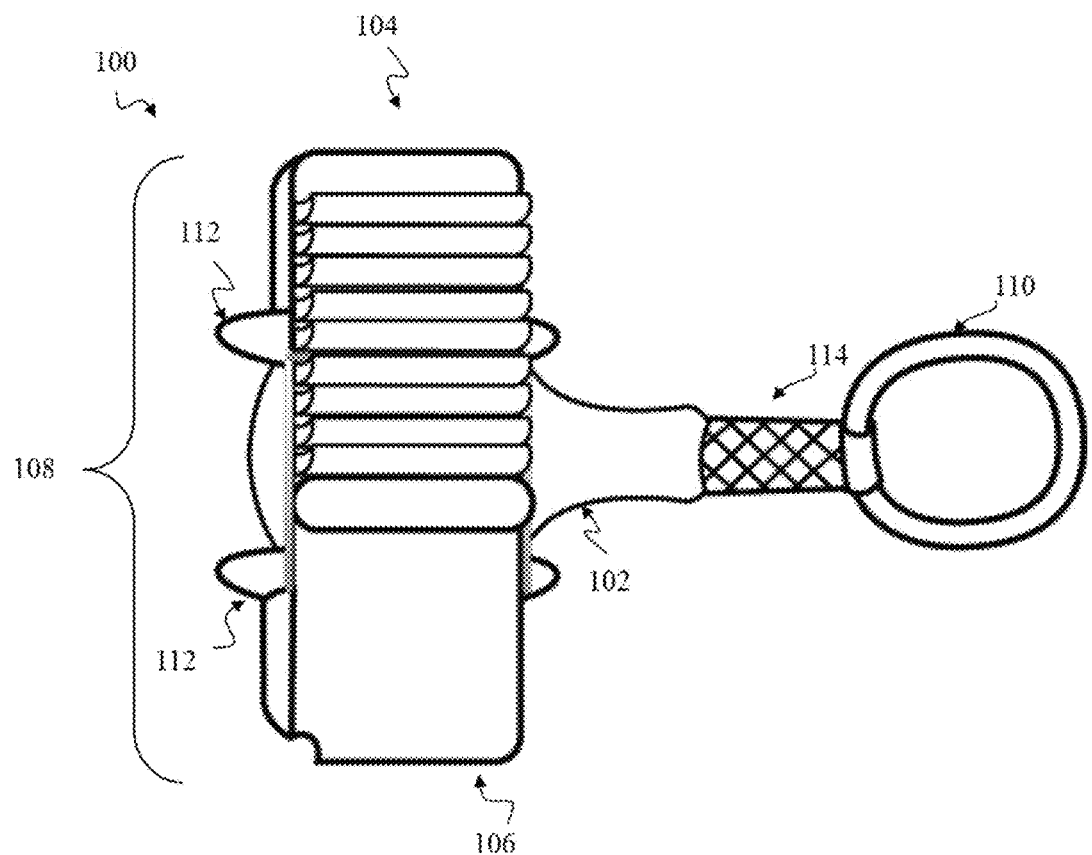
FIG. 3 is a top view illustratively depicting an exemplary footwear clamp bag accessory in an exemplary locked position, in accordance with exemplary embodiments of the present invention.
Figure 4A:
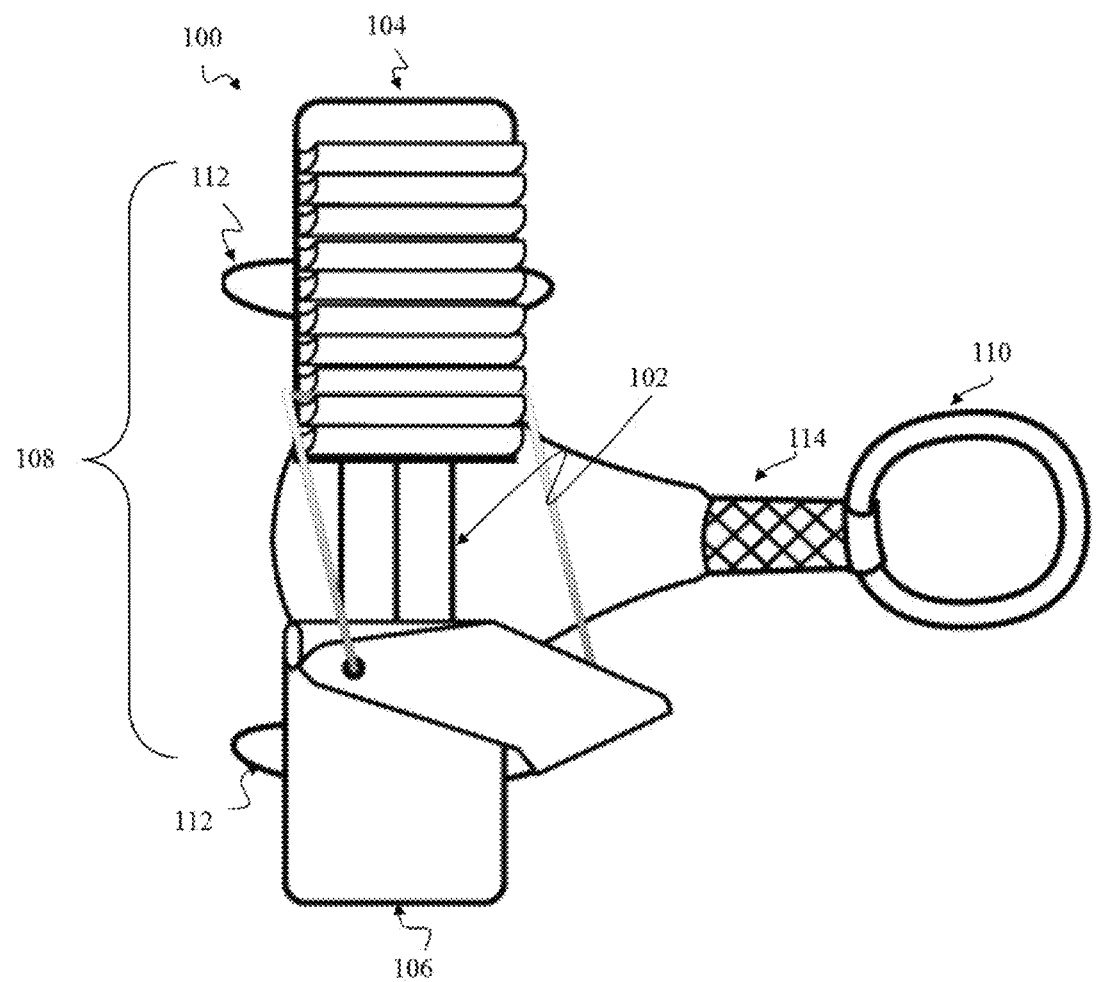
FIGS. 4A-4B are top views illustratively depicting an exemplary footwear clamp bag accessory in an exemplary unlocked position, in accordance with exemplary embodiments of the present invention.
Figure 4B:
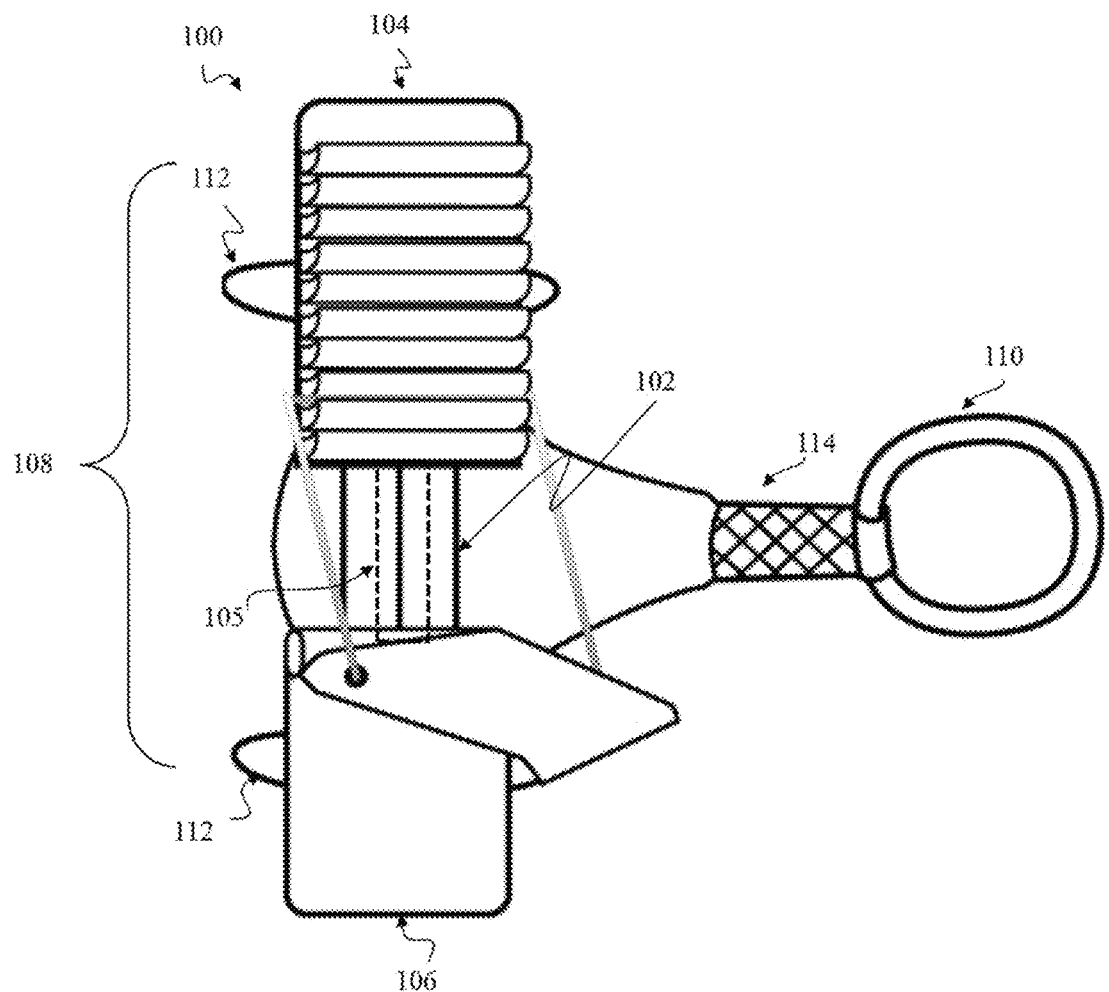
Figure 5:
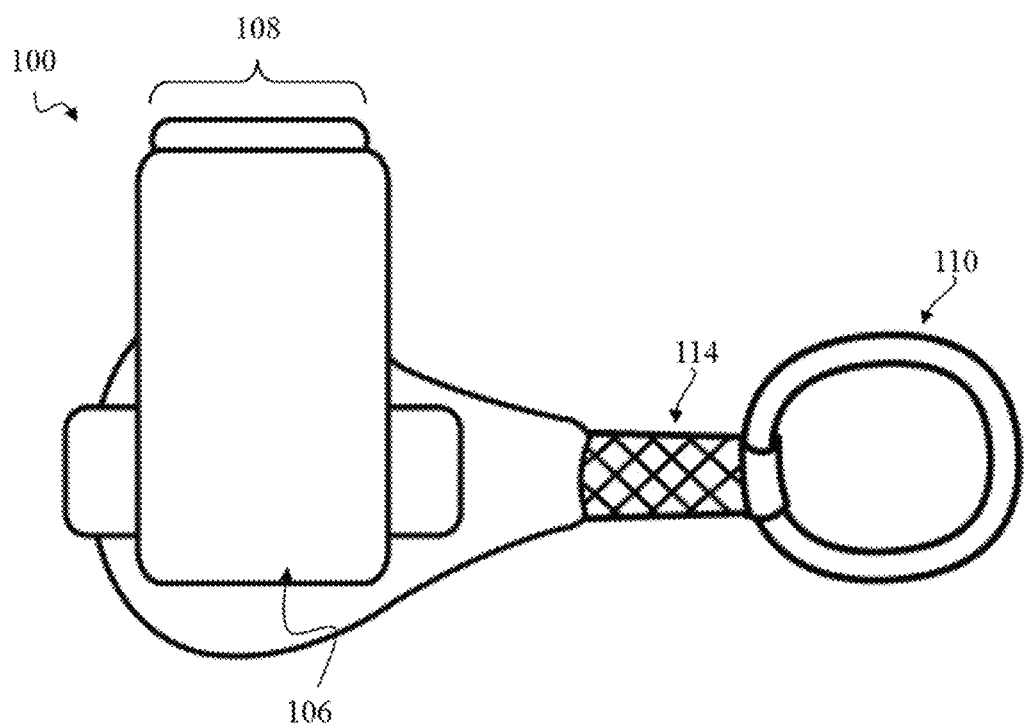
FIG. 5 is a side view illustratively depicting an exemplary footwear clamp bag accessory, in accordance with exemplary embodiments of the present invention.
Figure 6:
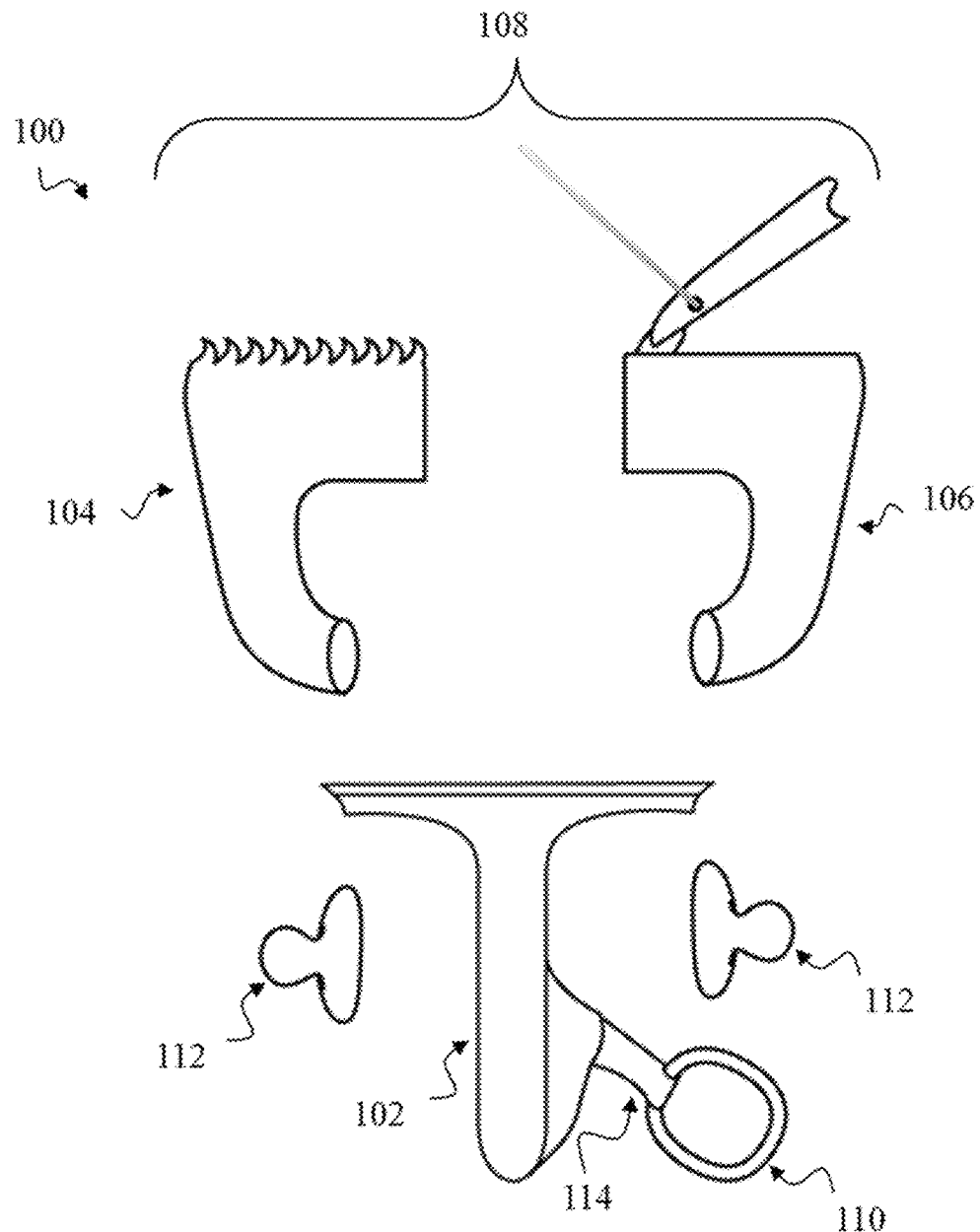
FIG. 6 is an exploded view illustratively depicting at least some elements of an exemplary footwear clamp bag accessory, in accordance with exemplary embodiments of the present invention.
Figure 7:
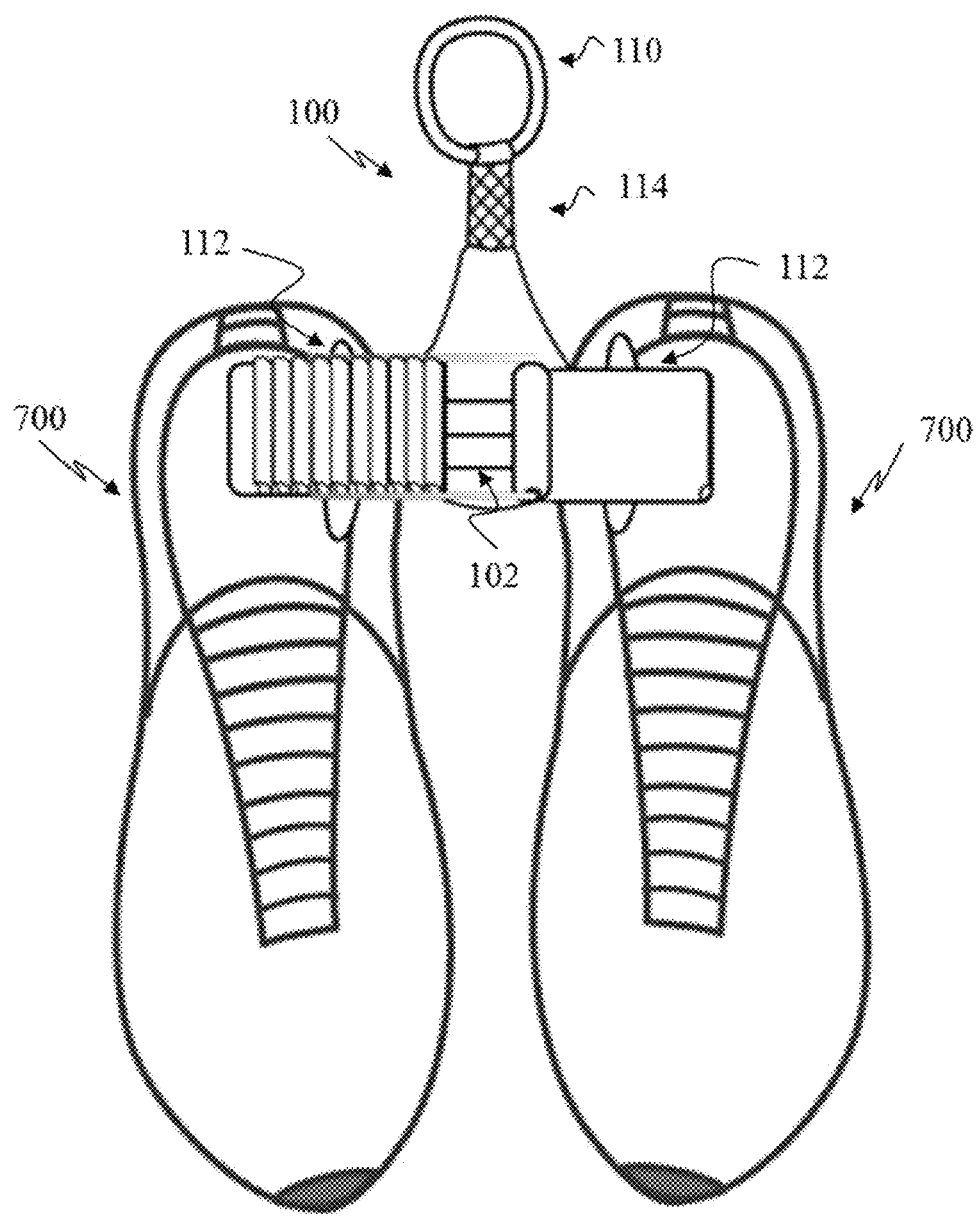
FIG. 7 illustratively depicts an exemplary footwear clamp bag accessory retaining a pair of shoes, in accordance with exemplary embodiments of the present invention.

In exemplary embodiments footwear clamp bag accessory 100 can move between a locked and closed configuration, as illustrated in FIGS. 1, 3, and 7; and an unlocked and open configuration, as illustrated in FIGS. 2A-2B and 4A-4B.

Referring to FIGS. 2A-2B and 4A-4B, in exemplary embodiments, footwear clamp bag accessory 100 can be unlocked and opened such that, during use, at least a portion of base 102 can be placed between a pair of shoes (not shown) and at least a portion of left arm 104 and right 106 can be placed into openings of the shoes such that pads 112 are located below the lip/rim of opening of the shoes and substantially near the inside wall of the shoes.

Referring to FIGS. 1, and 3, using locking mechanism 108, a user can tighten/clamp left arm 104 to base 102 and right arm 106 to base 102 such that they apply pressure on the inside wall of the shoes (not shown).

Referring to FIG. 7, in the above configuration, with the each of shoes 700 securing tightly/clamped next to each other, footwear clamp bag accessory 100 can be clipped onto an object, for example, a user's hag (not shown) using the claw-lock/clip 110. When the user desires to use shoes 700, locking mechanism can be un-locked, as illustrated in FIGS. 2A-2B and 4A-4B, and the clamps can be removed from the opening of the shoes (not shown).

Footwear clamp bag accessory 100 can be designed to retain footwear and be coupled to an object to, for example, aerate footwear. This aeration can substantially dry out moist shoes, expose the shoes such that they can have a less offensive odor, and/or provide other benefits.

Further, footwear clamp bag accessory 100 can be designed to retain footwear and be coupled to an object to, for example, increase the free volume of a user's bag, substantially reduce interference with the movement and/or function of at least one of their hands, and/or enable a user to transport an additional pair of shoes.

Further still, the footwear clamp bag accessory can be designed to be substantially easy to use, for example, such that it can be operated with a single hand.

In exemplary embodiments, footwear clamp bag accessory 100 can include base 102 that is T-shaped and/or can include a horizontal portion (e.g., the "-" in the T shape) that left arm 104 and/or right arm 106 slidably move along. This horizontal portion can be and/or act as a guide rail that left arm 104 and/or right arm 106 slidably move along. Further, in exemplary embodiments, base 102 can have a vertical portion (e.g., the "I" in the T shape) that extends from the horizontal beam. Left arm 104 and right arm 106 can slide along the horizontal beam towards and away from the vertical portion of base 102. When in a desired position along the horizontal beam, left arm 104 and right arm 106 can be restricted (i.e., locking the footwear clamp bag accessory) by locking mechanism 108. Further, left arm 104 and right arm 106, and in some instances the vertical portion of base 102, can include pad 112. Further still, claw-lock/clip 110 can be coupled to base 102 via a strap 114.

In exemplary embodiments, left arm 104, right arm 106, and/or the vertical portion of base 102 can extend vertically downwards in an arched configuration and/or straight configuration such that, for example, the curvature of the arch and/or length of the arch can compensate for various shoe side-wall thicknesses. By way of example, left arm 104 and right arm 106 can extend vertically downwards in an arch configuration and the vertical portion of base 102 can extend vertically downwards in a substantially straight configuration. Further, left arm 104 and right arm 106 can arch inwards towards the substantially straight portion of base 102. In this configuration, the amount of curvature of the arch and/or the quantity of length of the arch can be selected for various side wall thicknesses.

Locking mechanism 108 can be any reasonable locking mechanism. FIGS. 1-7 illustratively depict only a hook and latch type locking mechanism. Of course, other mechanisms can be envisioned. For example, in exemplary embodiments, locking mechanism 108 can be a spring lever lock, vise-grip type lever lock, releasable wire tie type lever lock, and/or any other reasonable form of locking mechanism. Further, locking mechanism 108 may run on electricity so footwear clamp bag accessory 100 can further include a solar power cell to power locking mechanism 108 and/or some other source of power, for example, batteries.

In exemplary embodiment, claw-lock/clip 110 can be any reasonable locking and/or clipping mechanism such as, but not limited to, a carabineer, key ring, and/or any reasonable mechanism that can fasten, couple, lock, and/or clip.

In exemplary embodiments, during use, a left shoe can be placed between left arm 104 and the vertical portion of base 102 and a right shoe can be placed between right arm 106 and the vertical portion of base 102. In this configuration, the sidewall of the left shoe can be located between left arm 104 and the vertical portion of base 102 and the sidewall of the right shoe can be located between right arm 106 and the vertical portion of base 102.

Next, left arm 104 and right arm 106 can be moved inwards towards the vertical portion of base 102 causing pressure to be applied on the sidewalls of the left and right shoes. With the sidewall of the left shoe being squeezed (e.g., a desired amount of pressure applied on the sidewall of the left shoe) between left arm 104 and the vertical portion of base 102 and with the sidewall of the right shoe being squeezed (e.g., a desired amount of pressure applied on the sidewall of the right shoe) between right arm 106 and the vertical portion of base 102, locking mechanism 108 can be locked into position thereby clamping the shoes in place. Footwear clamp bag accessory 100 (with the clamped shoes) can then be attached to a bag by claw-lock/clip 110. This can provide the benefit of not having other objects in the bag smell like the shoes.

In some instances, the region of left arm 104, right arm 106, and/or the vertical portion of base 102 that contacts the users shoes ("shoe contacting portion") can be substantially flat with a substantially large surface area such that when the shoes are clamped together the pressure does not damage the shoes. In some instances, the region of the left arm 104, right arm 106, and/or vertical portion of base 102 that contacts the users shoes can include pads 112 that are designed such that when the shoes are clamped together the pressure does not damage the shoes.

In exemplary embodiments, any element of footwear clamp bag accessory 100 can be constructed to emit a scent and/or absorb odors and any element of footwear clamp bag accessory 100 can include a material, such as a scent emitting element and/or deodorizing element added to it, capable of emitting a scent and/or absorbing a scent. This can be used to de-odorize the shoes while they are clamped. For example, left arm 104, right arm 106, the vertical portion of base 102, and/or pad 112 can be constructed of and/or include activated carbon, a material that outgases from them, and/or can be constructed of and/or include any material that has odor-neutralizing/absorbing and/or scent emitting qualities.

By way of example, a deodorizing element can mate with a portion of the length of left arm 104, right arm 106, and/or the vertical portion of base 102. That is, left arm 104, right arm 106, and/or the vertical portion of base 102 can include grooves and/or some other shape that the deodorizing element can couple to. For example, the deodorizing element can be a deodorizer cartridge that can be changed when desired.

By way of another example, pad 112 can include and/or be a deodorizing element and/or can emit scents and/or absorb scents. Either pad 112 and/or the deodorizing element can be constructed such that it couples to the contacting portions of left arm 104, right arm 106, and/or the vertical portion of base 102 in a manner such that it can be attached and/or replaced with another deodorizing cartridge and/or pad.

In exemplary embodiments, arm 104, right arm 106, and/or the horizontal portion of base 102 can be constructed so that left arm 104 and/or right arm 106 cannot detach from base 102. This can be done so that left arm 104 and/or right arm 106 are not lost and/or do not simply fall off of the horizontal portion of base 102. For example, left arm 104 and right arm 106 can be attached to one another via the horizontal portion of base 102 (e.g., if the horizontal is hollow) by a cord 105 (e.g., a flexible shock cord). As another example, left arm 104 and right arm 106 can be restricted from decoupling from the horizontal beam by a stopper mechanism (e.g., a rift, protrusion, etc.) that can be located on the inside surface of base 102, on the external surface of base 102, and/or on any portion of left arm 104 and/or right arm 106 that, for example, receives the horizontal portion of base 102. Of course, left arm 104 and right arm 106 can be restricted from decoupling from the horizontal beam by other mechanisms as well.

In exemplary embodiments, footwear clamp bag accessory 100 can further include a light, such as an LED, light attachment, and/or glow in the dark, to enhance safety. Further, footwear clamp bag accessory 100 can, in some instance, include solar cells to provide power to, for example, a light, LED, light attachment, locking mechanism, and/or anything that can require power. To glow in the dark, footwear clamp bag accessory 100 can be constructed of and/or include a phosphors material such as, but not limited to, Zinc Sulfide and Strontium Aluminate, to name a few.

In exemplary embodiments, footwear clamp bag accessory 100 can further include a guard and/or rain guard to conceal and/or protect retained shoes from getting wet (e.g., in the rain). For example, footwear clam bag accessory 100 can include a plastic bag that can be, for example, coupled to base 102 so that it can be used to guard and/or protect retained shoes from getting wet.

In exemplary embodiments, footwear clamp bag accessory 100 can also be constructed in the other shapes. For example, the overall shape and/or an external shell of footwear clamp bag accessory 100 can be that of a super hero, animal, or any other shape. That is, other shapes and configurations, other than those illustrated and/or discussed, are not outside the scope of the invention.

It will be understood that the terms footwear item, shoes, and the like, refer to any form of footwear item and/or shoe such as, but not limited to, shoes, boots, sneakers, trainers, running shoes, cleats, and/or any other form of footwear. For ease, at times, the terms footwear item and/or shoes are used. This is merely for ease and is in no way meant to be a limitation.

It will be understood that the terms bag and/or other object refer to any form of bag and/or object that the footwear clamp bag accessory can be coupled to such as, but not limited to, a purse, back pack, duffle bag, bag, and/or any other object that the footwear clamp bag accessory can be coupled to. For ease, at times, the terms bag and/or other object are used. This is merely for ease and is in no way meant to be a limitation.

Now that exemplary embodiments of the present disclosure have been shown and described in detail, various modifications and improvements thereon will become readily apparent to those skilled in the art.

What is claimed is:

1. A footwear clamp bag accessory for holding shoes together and coupling structures, comprising:
   a base having a horizontal portion and a base shoe retaining portion, the base shoe retaining portion extending vertically downwards from the horizontal portion and dividing the horizontal portion into a left horizontal portion and a right horizontal portion;
   a left arm having a left horizontal receiving portion and a left shoe retaining portion, the left shoe retaining portion extending vertically downwards from the left horizontal receiving portion, the left horizontal receiving portion slidably coupling to the left horizontal portion of the base such that left arm is capable of moving towards and away from the base shoe retaining portion;
   a right arm having a right horizontal receiving portion and a right shoe retaining portion, the right shoe retaining portion extending vertically downwards from the right horizontal receiving portion, the right horizontal receiving portion slidably coupling to the right horizontal portion of the base such that right arm is capable of moving towards and away from the base shoe retaining portion;
   a locking mechanism that restricts the left arm and the right arm from moving away from the base shoe retaining portion for clamping shoes;
   a clip connected to a strap, the strap being affixed to the base;
   and the clip being for attaching the accessory to structures.

2. The footwear clamp bag accessory of claim 1, wherein the horizontal portion of the base and the base shoe retaining portion are constructed in a t-shaped configuration.

3. The footwear clamp bag accessory of claim 1, wherein at least one of the left arm, the right arm, and the base, is further comprising:
   a shoe contacting region that is substantially flat and sized to reduce the risk of damaging clamped shoes.

4. The footwear clamp bag accessory of claim 1, wherein at least one of the left arm, the right arm, and the base at least one of emits scents and absorb scents.

5. The footwear clamp bag accessory of claim 1, wherein movement of the left and right arms along the horizontal portion of the base is restricted such that they cannot be completely separated or removed from the base.

6. The footwear clamp bag accessory of claim 5, wherein movement of the left and right arms is restricted by a shock cord connecting the left and right arms.

7. The footwear clamp bag accessory of claim 5, wherein movement of the left and right arms is restricted by at least one of (i) a stopper mechanism located on an internal surface the base, (ii) a stopper mechanism located on an external surface of the base, and (iii) a stopper mechanism located on the left arm and the right arm.

8. The footwear clamp bag accessory of claim 1, wherein the locking mechanism is further comprising:
   a hook on one of the left arm and right arm; and
   a series of latches at various distances on one of the left arm and right arm not having the hook.

9. The footwear clamp bag accessory of claim 1, wherein the left arm, the right arm, and the base shoe retaining portion, is further comprising:
   a configuration wherein:
       the left arm and the right arm extend vertically downwards in an arch configuration;
       the left arm and the right arm have arches which arch inwards towards the base shoe retaining portion;
       the left arm and the right arm arches have a curvature and a length; and
   wherein the curvature of the left arm and right arm arches and the length of the left arm and right arm arches compensate for various shoe side wall thicknesses.

10. The footwear clamp bag accessory of claim 1, wherein the left arm and the right arm, are further comprising:
    at least one opening in the left arm and the right arm, the at least one opening receiving the left horizontal portion of the base and the right horizontal portion of the base respectively.

11. A footwear clamp for holding shoes together comprising:
    a base having a horizontal portion and a base shoe retaining portion, the base shoe retaining portion extending vertically downwards from the horizontal portion and dividing the horizontal portion into a left horizontal portion and a right horizontal portion;
    a left arm having a left horizontal receiving portion and a left shoe retaining portion, the left horizontal receiving portion slidingly mounted along the left horizontal portion of the base, the left shoe retaining portion extending vertically downwards from the left horizontal receiving portion;
    a right arm having a right horizontal receiving portion and a right shoe retaining portion, the right horizontal receiving portion slidingly mounted along the right horizontal portion of the base, the right shoe retaining portion extending vertically downwards from the right horizontal receiving portion;
    stops on the left horizontal portion and right horizontal portion of the base that limit the travel of the left and right arms away from the base shoe retaining portion;
    a locking mechanism that clamps the left arm and the right arm and brings the left shoe retaining portion and right shoe retaining portion towards the base shoe retaining portion to hold shoes within the accessory.

12. The footwear clamp of claim 11 wherein the locking mechanism is a clamp fastening the left arm to the right arm.

13. The footwear clamp of claim 11 wherein the locking mechanism fastens the left arm to the horizontal portion of the base.

14. The footwear clamp of claim 12 wherein an inner surface of the left arm and an inner surface of the base shoe retaining portion facing the inner surface of the left arm each include a shoe contacting region that is substantially flat and sized to reduce the risk of damaging clamped shoes.

15. The footwear clamp of claim 14 further including a shoe contacting region on an inner surface of the right arm and on an inner surface of the base shoe retaining portion facing, the inner surface of the right arm.

16. The footwear clamp of claim 11, wherein the horizontal portion of the base and the base shoe retaining portion are constructed in a t-shaped configuration.

17. The footwear clamp of claim 15, wherein the horizontal portion of the base and the base shoe retaining portion are constructed in a t-shaped configuration.

18. A footwear clamp for holding shoes together comprising:
    a base having a horizontal portion and a base shoe retaining portion, the base shoe retaining portion extending vertically downwards from the horizontal portion and dividing the horizontal portion into a left horizontal portion and a right horizontal portion;

a left arm having a left horizontal receiving portion and a left shoe retaining portion, the left horizontal receiving portion slidingly mounted along the left horizontal portion of the base, the left shoe retaining portion extending vertically downwards from the left horizontal receiving portion;

a right arm having a right horizontal receiving portion and a right shoe retaining portion, the right horizontal receiving portion slidingly mounted along the right horizontal portion of the base, the right shoe retaining portion extending vertically downwards from the right horizontal receiving portion;

a locking mechanism that clamps the left arm and the right arm and brings the left shoe retaining portion and right shoe retaining portion towards the base shoe retaining portion to hold shoes within the accessory.

* * * * *

UNITED STATES PATENT AND TRADEMARK OFFICE
CERTIFICATE OF CORRECTION

| | | |
|---|---|---|
| PATENT NO. | : 8,714,370 B2 | Page 1 of 1 |
| APPLICATION NO. | : 12/947325 | |
| DATED | : May 6, 2014 | |
| INVENTOR(S) | : Nour Jebara et al. | |

It is certified that error appears in the above-identified patent and that said Letters Patent is hereby corrected as shown below:

Title page, item [30] the foreign application priority data date of

"Nov. 23, 2009"

should be changed to

--Feb. 23, 2010--

Signed and Sealed this
Twelfth Day of August, 2014

Michelle K. Lee
*Deputy Director of the United States Patent and Trademark Office*